May 26, 1964  S. B. WERTHEIMER  3,134,945
COMBINATION VEHICLE RADIO AND PORTABLE RADIO
Original Filed Dec. 24, 1958  3 Sheets-Sheet 1
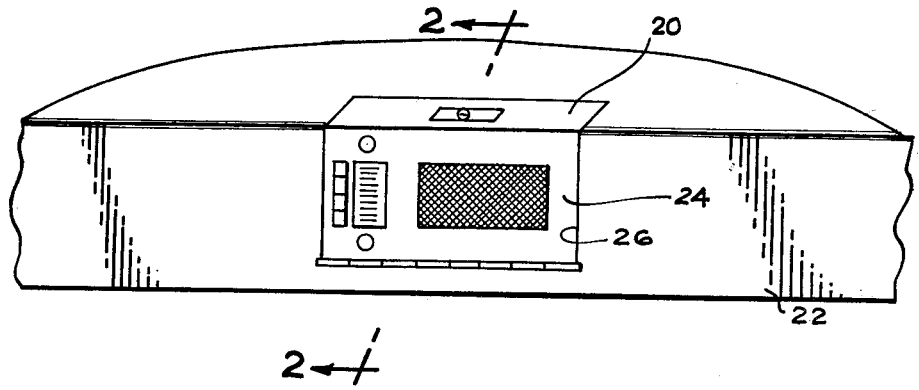
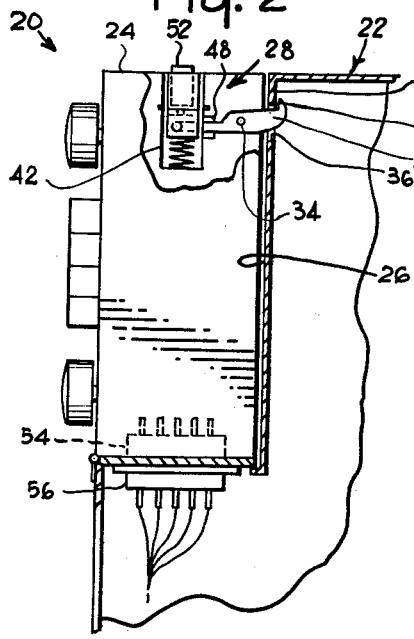
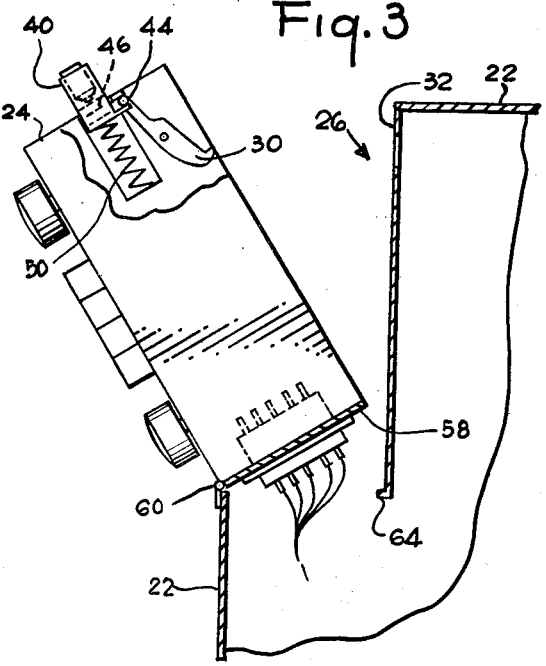
INVENTOR.
SIDNEY B. WERTHEIMER
BY
Ooms, McDougall, Williams & Hersh
Attorneys

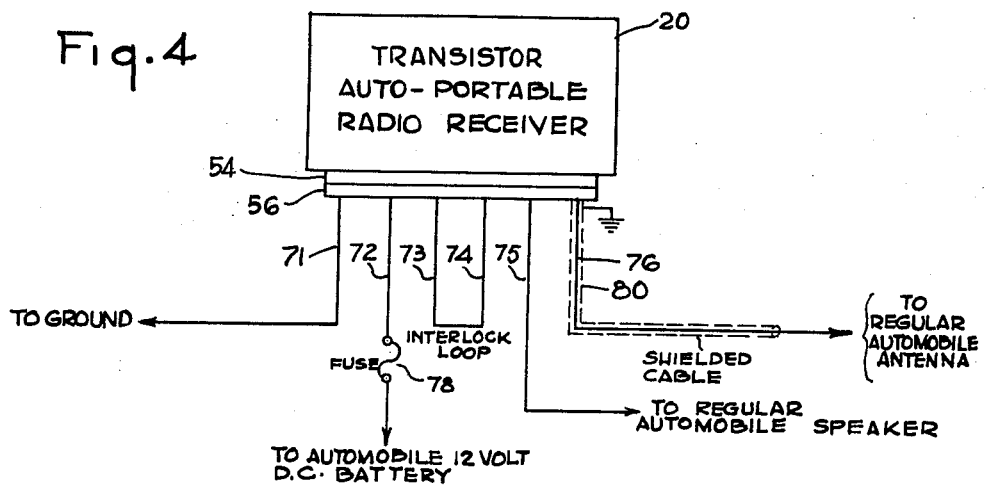
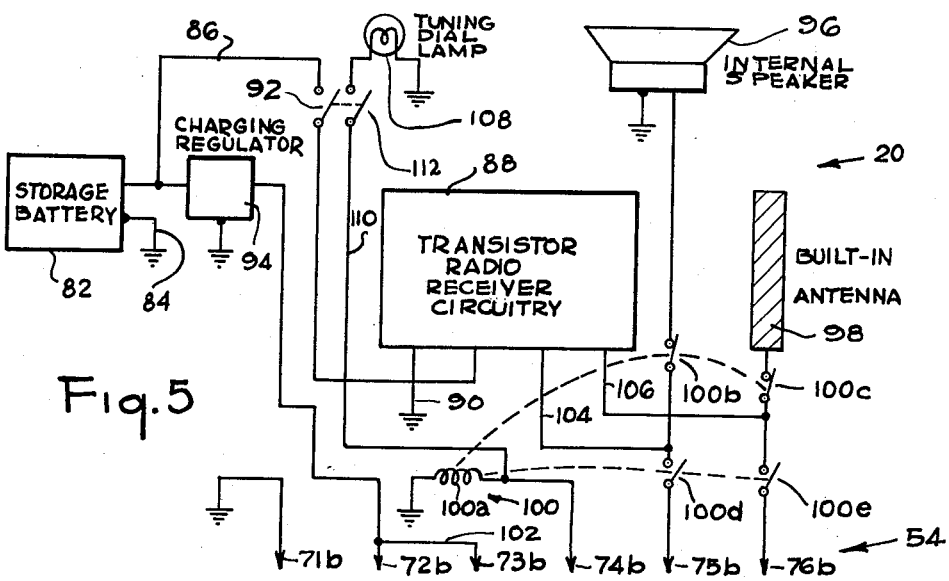
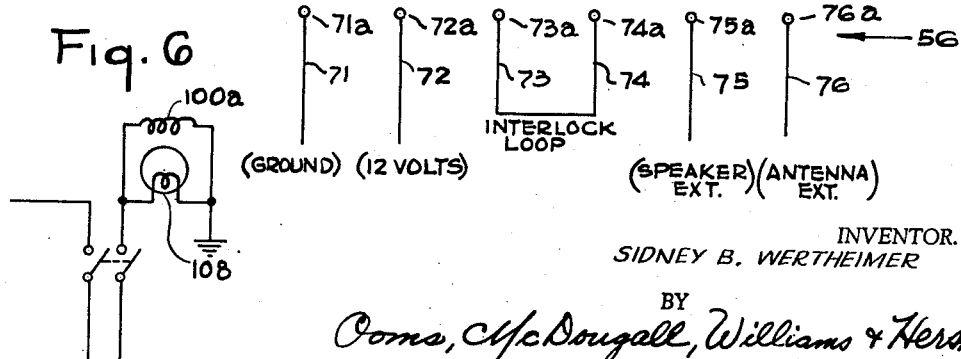
INVENTOR.
SIDNEY B. WERTHEIMER

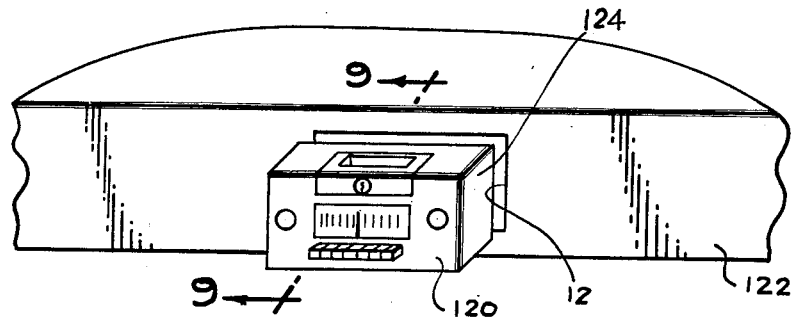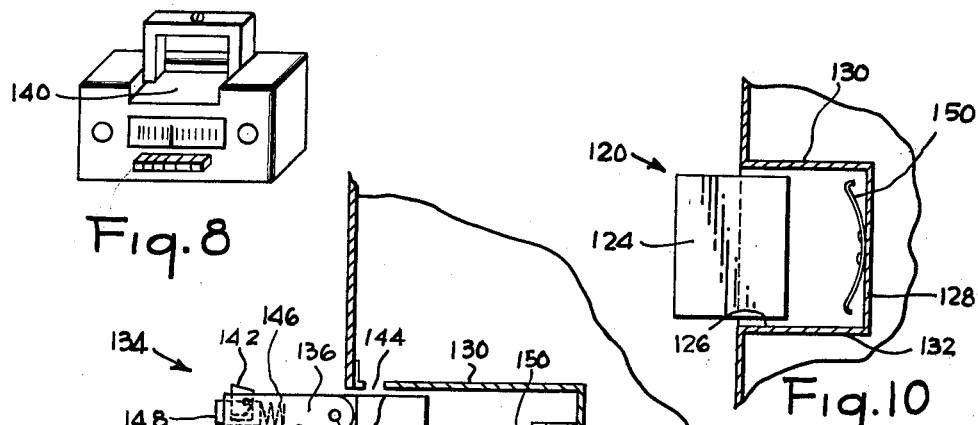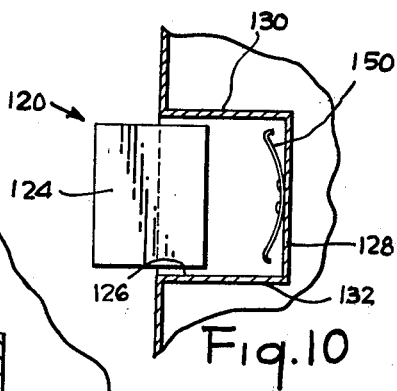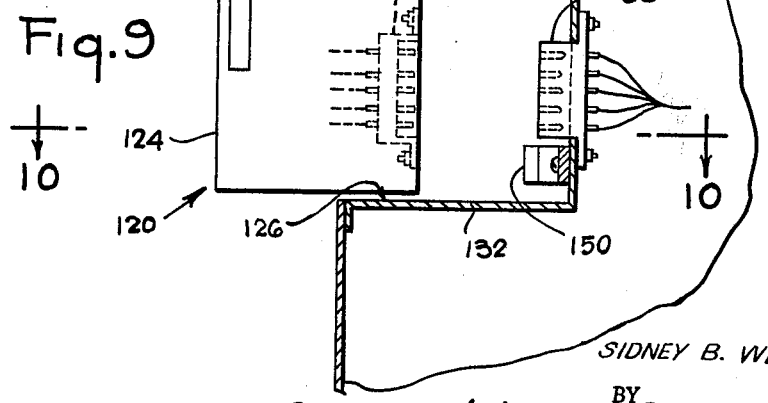

United States Patent Office 3,134,945
Patented May 26, 1964

3,134,945
COMBINATION VEHICLE RADIO AND
PORTABLE RADIO
Sidney B. Wertheimer, 7403 Woodmar St.,
Hammond, Ind.
Original application Dec. 24, 1958, Ser. No. 782,873.
Divided and this application Apr. 23, 1962, Ser. No. 189,626
9 Claims. (Cl. 325—312)

This invention relates to radio receivers. One object of the present invention is to provide a radio receiver which is arranged not only for operation in an automobile or other vehicle, but also as a portable radio adapted to be carried in the hand and operated under self-contained power. This application is a division of my copending application Serial No. 782,873, filed December 24, 1958, and now abandoned.

A further object is to provide a new and improved arrangement in which the radio receiver is normally received in an opening in the dashboard of an automobile, but may be removed quickly and conveniently for use as a portable radio receiver.

Another object is to provide a new and improved arrangement of the foregoing character, in which the radio receiver is locked in its place in the dashboard, so as to prevent theft or unauthorized removal of the receiver.

Still another object is to provide a combination automobile and portable radio of the foregoing character which is highly serviceable and convenient, yet is low in cost.

Further objects and advantages of the invention will appear from the following description, taken with the accompanying drawings, in which:

FIG. 1 is a perspective view showing a combination automobile and portable radio to be described as an illustrative embodiment of the present invention, the radio being shown in its place on the dashboard of an automobile or other vehicle.

FIG. 2 is a fragmentary cross-sectional view, taken generally along a line 2—2 in FIG. 1, the radio being shown in its locked position.

FIG. 3 is a view similar to FIG. 2, but showing the manner in which the radio is unlocked and swung outwardly for removal from the automobile.

FIG. 4 is a general circuit diagram showing the manner in which external connections are made to the radio receiver when it is installed in the automobile.

FIG. 5 is a more detailed circuit diagram illustrating the manner in which the connections are changed between portable and automobile operation.

FIG. 6 is a fragmentary circuit diagram, corresponding to a portion of FIG. 5, but showing a modification.

FIG. 7 is a perspective view showing a modified arrangement for mounting a portable radio receiver in the dashboard of a vehicle, the radio being shown partly removed from the dashboard.

FIG. 8 is a perspective view showing the radio of FIG. 7 fully removed from the automobile and arranged for portable operation.

FIG. 9 is a cross-sectional view, taken generally along a line 9—9 in FIG. 7.

FIG. 10 is a small scale sectional view taken along a line 10—10 in FIG. 9.

It will be evident that FIG. 1 illustrates a radio receiver 20 which is normaly mounted on a dashboard or control panel 22 of an automobile or other vehicle. From FIGS. 2 and 3, it will be apparent that the radio 20 may readily be removed from the dashboard 22. Moreover, the radio 20 is so arranged that it may be operated as a self-contained portable radio receiver.

Of course, both automobile radios and portable radios have already become very popular. Such units have been purchased by many persons. In many cases, persons have purchased both types of units. With the present invention, a single unit may be employed as both an automobile radio and a portable radio, thus obviating any need for duplicate radio equipment. The radios of the present invention may be sold very advantageously as original equipment with new automobiles, in which case the availability of such radio equipment will add considerable sales appeal to the automobile. Of course, the radios of the present invention may also be sold for use on existing automobiles or other vehicles.

It will be seen that the illustrated radio 20 has a case or cabinet 24 which is adapted to be received in an opening or recess 26 formed in the dashboard 22. When the radio 20 is installed, the case 24 is preferably flush with the outer surfaces of the dashboard 22, so as to blend in an attractive and pleasing manner with the dashboard. The shape of the case 24 may be such as to match the contours of the dashboard 22.

The illustrated radio 20 is arranged to be locked in place on the dashboard 22, so as to avoid theft or unauthorized removal of the radio. At the same time, the radio is easily removable by the authorized user.

As shown, a locking arrangement 28 is provided to secure the case 24 to the dashboard 22. As shown to advantage in FIGS. 2 and 3, the locking arrangement 28 comprises a latch 30 which is adapted to move into interlocking engagement with a plate or other member 32 on the dashboard. In its inactive position, the latch 30 is contained within the case 24, as shown in FIG. 3. The illustrated latch 30 is swingable about a pivot 34 in the case 24. It will be evident that the latch 30 is swingable rearwardly and upwardly out of the rear side of the case 24. A slot or other opening 36 is formed in the plate 32 to receive the latch 30. In this case, the plate 24 extends vertically across the rear side of the opening 26. The latch has a hook or shoulder portion 38 adapted to be moved upwardly behind the plate 32, so as to prevent forward movement of the case 24.

In the illustrated arrangement the latch is operated by a handle 40, which also is employed to carry the radio 20 when it is detached from the dashboard 22. As shown, the handle 40 takes the form of a bar which is slidable into a slot or recess 42 formed in the top of the case 24. In its extended position, the handle 40 may be employed to carry the radio 20. The latch 30 is connected to the handle, so that the latch will be extended when the handle is pushed into the slot 42. A pin-and-slot connection may advantageously be employed between the handle 40 and the latch 30. Thus, a pin 44 is mounted on the latch 30 and is slidably received in a slot 46 which is formed in a member 48 carried by the handle 40. In this case, a compression spring 50 is employed to bias the handle 40 outwardly into its extended position. A rotary lock cylinder 52 is mounted in the handle to lock the handle in its retracted position, as shown in FIG. 2. In this position, the latch 30 is extended rearwardly to prevent removal of the radio 20 from the dashboard 22.

When the radio 20 is installed in the dashboard 22, it is preferred to supply power to the radio from the electrical system of the automobile or other vehicle. In the illustrated arrangement, the power is supplied to the radio by means of disengageable connectors 54 and 56. Suitable connectors are already available on the market. In this case, the connector 54 is mounted on the bottom of the radio receiver 20, while the connector 56 is secured to a shelf or supporting plate 58, which is mounted on the dashboard 22. The illustrated shelf 58 is adapted to extend across the lower end of the opening 26 in the dashboard 22. For convenience in removing the radio 20, a hinge 60 is employed to connect the front edge of the shelf 58 to the dashboard 22. Thus, the shelf 58 may be swung upwardly about the hinge 60. In its normal position, the shelf 58 is supported at its rear edge by a ledge or flange 64 on the plate 32.

When the radio 20 is to be removed from the dashboard 22, the lock cylinder 52 is unlocked by means of a suitable key. This releases the handle 40 so that the spring 50 may push it upwardly. The upward movement of the handle causes the latch 30 to swing into the case 24 of the radio. Thus, the latch 30 is disengaged from the plate 32. The radio 20 may then be swung forwardly about the hinge 60, and may be detached from the shelf 58 by pulling the connector 54 out of engagement with the connector 56.

To reinstall the radio, the connector 54 is engaged with the connector 56. This operation may be facilitated by swinging the shelf 58 upwardly. The radio case 24 may then be swung into the opening 26. To lock the radio 20 in the opening 26, the handle 40 is pushed downwardly and is secured in this position by rotating the lock cylinder 52. The downward movement of the handle 40 extends the latch 30 through the slot 36, so that the latch will interlock with the plate 32.

As shown in FIGS. 4–6, the connectors 54 and 56 may be employed to make various external connections to the radio 20. In this case, six connections are made to the connector 56, by means of leads 71, 72, 73, 74, 75 and 76. The leads 71 and 72 may be employed to supply power to the radio 20 from the electrical system of the automobile. In this case, the lead 71 is connected to ground, while the lead 72 is connected to the ungrounded terminal of the storage battery in the automobile. A suitable fuse 78 may be connected in series with the lead 72.

The leads 73 and 74 are connected together to provide a control or interlock connection, whereby a changeover is effected between portable and automobile operation.

The lead 75 may be connected to an external loudspeaker such as one mounted under the dash of the automobile, or in some other suitable location. The return connection from the loudspeaker may be made through the ground lead 71.

The lead 76 may be connected to an external antenna, which may be mounted on the automobile in some suitable location. A grounded shield 80 may be employed around the lead 76.

Further details of the electrical arrangement are shown in FIG. 5. It will be apparent that the connector 56 takes the form of a receptacle or socket, having contacts 71a, 72a, 73a, 74a, 75a and 76a. The illustrated connector 54 comprises a recessed plug having prongs 71b, 72b, 73b, 74b, 75b and 76b, engageable with the respective contacts 71a–76a.

As already indicated, the radio receiver 20 is adapted to be operated on power from a self-contained or internal storage battery 82, which may be of a suitable miniature type, already available on the market. One side of the battery 82 may be connected to ground through a lead 84, while the other side may be connected to the radio receiver 20 by a lead 86. The radio 20 may employ any suitable radio receiving circuit, represented by a box or block 88. Preferably, the circuit 88 is of a type utilizing transistors, so as to achieve efficient operation with extremely lower power consumption. Power is supplied to the circuit 88 by the lead 86 and a ground lead 90. A switch 92 may be connected in series with the lead 86 to control the energization of the circuit 88.

In this case, the battery 82 is employed to operate the circuit 88 when the radio is mounted in the dashboard 22, as well as when the radio is employed as a portable receiver. However, the internal storage battery 82 is charged, as needed, from the electrical system of the automobile, when the radio is installed in the dashboard 22.

For this purpose, a charging regulator 94, of any known or suitable construction, is connected between the terminal 72b and the ungrounded terminal of the storage battery 82.

The illustrated radio 20 has an internal loudspeaker 96 and an internal antenna 98. Of course, the antenna 98 may actually extend outside the case 24, but it is mounted in the case. The internal speaker 96 and the internal antenna 98 are employed for portable operation. However, for automobile operation, it is preferred to employ an external speaker and an external antenna, connected to the leads 75 and 76. In this case, a relay 100 is employed to effect a changeover between the internal and external speakers and antenna. As shown, the relay 100 has an operating coil 100a which is connected between the control contact 74b and ground. A lead 102 is connected between the other control contact 73b and the power contact 72b. Thus, when the connectors 54 and 56 are engaged, the relay coil 100a is energized through the closed loop formed by the control leads 73 and 74. Of course, when the connectors 54 and 56 are separated, the relay coil 100a is de-energized.

The illustrated relay 100 has normally closed contacts 100b and 100c, as well as normally open contacts 100d and 100e. The normally closed contacts are employed to connect the internal speaker and antenna 96 and 98 to the receiver circuit 88 for portable operation. For automobile operation, the normally open contacts connect the receiver circuit 88 to the external speaker and antenna.

Thus, the speaker and antenna connections are made to the circuit 88 by leads 104 and 106. The normally closed contacts 100b are connected between the lead 104 and the internal speaker 96. Similarly, the normally closed contacts 100c are connected between the lead 106 and the internal antenna 98. It will be seen that the normally open contacts 100d are connected between the lead 104 and the contact 75b, which affords a connection to the external speaker. The contacts 100e are connected between the lead 106 and the contact 76b, running to the external antenna.

The illustrated radio 20 has one or more dial lamps 108, which, however, are operated only when the receiver is mounted in the dashboard of the automobile. For portable operation, the lamp 108 is not operated, to save battery current. Thus, one side of the lamp is grounded while the other side is connected to the control contact 74b through a lead 110. A switch 112 may be connected in series with the lead 110. As indicated in FIG. 5, the switches 92 and 112 may be ganged together for simultaneous operation. Thus, the lamp 108 will be lighted when power is being supplied to the receiver circuit 88. It will be recalled that the control contact 74b is supplied with power through the leads 73 and 74, when the connectors 54 and 56 are joined. Thus, the dial lamp 108 is energized from the electrical system of the automobile when the radio is installed in the automobile.

FIG. 6 shows a slightly modified arrangement in which the relay coil 100a is connected directly in parallel with the dial lamp 108. With this arrangement, the relay 100 will be operated when the switch 112 is closed, but not when the switch is open. Thus, the relay 100 operates only when the receiver circuit 88 is being supplied with power. This arrangement has the advantage of minimizing the consumption of power from the electrical system of the automobile.

In the arrangement of FIGS. 1–3, the recess 26 for the radio 20 is open at the top and front. The locking arrangement 28 prevents upward and forward movement of the upper portion of the radio case 24. At its lower end, the case 24 is restrained against forward movement by the engagement of the connectors 54 and 56. As already indicated, the radio 20 may be removed by unlocking the lock cylinder 52.

FIGS. 7, 8 and 9 illustrate a somewhat modified arrangement utilizing a radio 120, adapted to be received in an opening or recess 126 which is formed in a dashboard or control panel 122. The radio 120 has a case or cabinet 124 which fits into the opening 126. In this instance, the opening or recess 126 is closed at the top and is open only toward the front. The radio case 124 may fit into the opening 126 so that the front of the case will be flush with the front surface of the dashboard 122.

As shown in FIG. 9, the rear, top and bottom of the recess 126 are closed by walls 128, 130 and 132. As in the embodiment of FIGS. 1–3, the connectors 54 and 56 may be employed to establish external electrical connections to the radio 20. However, in this case the connector 56 is secured to the rear wall 128 of the recess 126, while the connector 54 is mounted at the rear of the radio case 124. The connectors are engaged simply by pushing the radio 20 into the recess 106.

A somewhat modified locking arrangement 134 is employed to retain the radio 120 in the opening 126, so as to prevent theft or unauthorized removal of the radio. In this instance, the radio 120 is provided with a handle 136 which is swingable between an erected position as shown in FIG. 8, and the folded position of FIG. 9. The handle 136 is mounted on the case 124 by means of pivots 138. A recess 140 is formed in the top of the case to receive the handle in its folded position, so that the handle will be flush with the case.

A latch 142 is slidably mounted in the handle 136 to retain the radio 120 in the opening 126. A slot 144 is formed in the upper wall 130 of the opening 126 to receive the latch 142. A spring 146 normally tends to extend the latch 142 upwardly, but the latch may be retracted by pushing inwardly on a lock cylinder 148. To lock the latch 142, the lock cylinder 148 may be rotated by means of a suitable key. This will prevent theft or unauthorized removal of the radio 120 from the opening 126.

In order that the radio 120 may readily be removed from the recess 126 after the lock 134 has been released, the radio is biased outwardly by means of springs 150. It will be seen that the illustrated springs 150 are bow shaped in form and are secured to the rear wall 128 of the recess 126, for engagement with the case 124. When the radio 120 is installed, the resistance of the springs 150 is overcome by pushing the radio inwardly until the latch 142 enters the slot 144. When the latch 142 is released, the springs 150 push the radio case 124 outwardly so that it may readily be grasped and pulled out of the recess 126. The handle 146 may then be swung upwardly for use in carrying the radio.

It will be apparent that the radios of the present invention may be employed very conveniently as portable radio receivers. In addition, they may be mounted in an automobile or other vehicle for use as vehicle radio receivers. This arrangement is highly convenient and economical, because it avoids the need for duplication of portable and vehicle radio equipment. The radio may ordinarily be installed in the automobile or other vehicle, so that it will always be available for portable use, wherever the automobile is driven. This arrangement is particularly advantageous when the automobile is used for picnics, outings at the beach, and the like.

Various other modifications, alternative constructions and equivalents may be employed without departing from the true spirit and scope of the invention, as exemplified in the foregoing description and defined in the following claims.

I claim:

1. In an automobile, the combination comprising a radio receiver having a case, a dashboard having an opening disengageably receiving said radio receiver with said case substantially flush with said dashboard, a handle mounted on the upper portion of said case and movable downwardly into said case, a spring biasing said handle upwardly, a latch connected to said handle and movable out of said case in response to downward movement of said handle into said case, means on said dashboard and having an opening for receiving said latch to retain said radio receiver in said dashboard, and a lock on said radio receiver for securing said handle in its downwardly displaced position.

2. In a vehicle, the combination comprising a radio receiver having a case, a dashboard having an opening for receiving said case, a shelf at the lower end of said opening for supporting said case, a hinge connecting the front edge of said shelf to said dashboard, said shelf thereby being swingable upwardly and forwardly for removal of said radio receiver from said dashboard, said case of said radio receiver being swingable upwardly and forwardly with said shelf, a first connector on the lower end of said case, a second connector removably engaged with said first connector and secured to said shelf, said connectors having contacts for supplying electrical power to said radio receiver, said connectors comprising disengageably interconnected plug and socket members constituting the sole means of connection between said case and said shelf, a movable latch on said case, means on said dashboard and having an opening for engagement by said latch to retain said case on said dashboard against upward and forward movement, a handle on said case and movable between first and second positions for operating said latch, a spring biasing said handle toward said first position, and a lock on said radio receiver for securing said handle in said second position to prevent unauthorized removal of said radio receiver.

3. The combination of claim 1, in which said lock is mounted on said handle.

4. The combination of claim 1, comprising means supporting said latch for upward movement out of said case, and means operable by said handle for moving said latch upwardly out of said case when said handle is moved downwardly into said case.

5. The combination of claim 2, in which said lock is mounted on said handle.

6. In a vehicle, the combination comprising a radio receiver having a case, a dashboard having an opening for receiving said case, a shelf at the lower end of said opening for supporting said case, a hinge connecting the front edge of said shelf to said dashboard, said shelf thereby being swingable upwardly and forwardly for removal of said radio receiver from said dashboard, said case of said radio receiver being swingable upwardly and forwardly with said shelf, a first connector on the lower end of said case, a second connector removably engaged with said first connector and secured to said shelf, said connectors having contacts for supplying electrical power to said radio receiver, said connectors comprising disengageably interconnected plug and socket members constituting the sole means of connection between said case and said shelf, a movable latch on said case, means on said dashboard and having an opening for engagement by said latch to retain said case on said dashboard against upward and forward movement, a handle mounted on the upper portion of said case and movable downwardly into said case, said case having a recess for receiving said handle, a spring biasing said handle upwardly, means connected between said latch and said handle for moving said latch outwardly from said case and into said opening when said handle is moved downwardly into said case, and a lock on said radio receiver for securing said handle in its downwardly displaced position.

7. The combination of claim 6, in which said lock is mounted on said handle.

8. In a vehicle, the combination comprising a radio receiver having a case, a dashboard having a recess therein for receiving said case, a shelf at the lower end of said recess for supporting said case, a hinge connecting the front edge of said shelf to said dashboard, said shelf thereby being swingable upwardly and forwardly for removal of said radio receiver from said dashboard, said case of said radio receiver being swingable upwardly and forwardly with said shelf, a first connector secured to the lower end of said case, a second connector removably engaged with said first connector and secured to said shelf, said connectors having contacts for supplying electrical power to said radio receiver, said connectors comprising disengageably interconnected plug and socket members constituting the sole means of connection between said case and said shelf, latching means for securing said case to said dashboard at a point spaced from said shelf to retain said case in said recess, and a lock for preventing the release of said latching means and thereby preventing unauthorized removal of said radio receiver from said dashboard.

9. In a vehicle, the combination comprising a radio receiver having a case, a dashboard having a recess therein for receiving said case, a plate at one end of said recess for supporting said case, a hinge connecting the outer edge of said plate to said dashboard, said plate thereby being swingable outwardly for removal of said radio receiver from said dashboard, said case of said radio receiver being swingable outwardly from said recess with said plate, a first connector secured to the lower end portion of said case, a second connector removably engaged with said first connector and secured to said plate, said connectors having contacts for supplying electric current to said radio receiver, said connectors comprising disengageably interconnected plug and socket members constituting the sole means of connection between said case and said plate, latching means for securing said case to said dashboard at a point spaced from said plate to retain said case in said recess, and a lock for preventing release of said latching means and thereby preventing unauthorized removal of said radio receiver from said dashboard.

References Cited in the file of this patent

UNITED STATES PATENTS

| | | |
|---|---|---|
| 2,077,284 | Te Pas | Apr. 13, 1937 |
| 2,280,465 | Barrett et al. | Apr. 21, 1942 |
| 2,487,601 | Schnoor et al. | Nov. 8, 1949 |
| 2,662,975 | Schwarz | Dec. 15, 1953 |
| 2,866,891 | Princ | Dec. 30, 1958 |
| 3,071,728 | Grace et al. | Jan. 1, 1963 |